US007082485B2

(12) United States Patent
Ellerbrock et al.

(10) Patent No.: US 7,082,485 B2
(45) Date of Patent: Jul. 25, 2006

(54) SYSTEMS AND METHODS FOR ESTABLISHING PEER-TO-PEER COMMUNICATIONS BETWEEN NETWORK DEVICES COMMUNICATING VIA A COMMON BUS

(75) Inventors: Philip John Ellerbrock, St. Peters, MO (US); Robert Leeman Grant, St. Peters, MO (US); Daniel William Konz, Florrisant, MO (US); Joseph P. Winkelmann, Jr., St. Peters, MO (US)

(73) Assignee: The Boeing Company, Seattle, WA (US)

( * ) Notice: Subject to any disclaimer, the term of this patent is extended or adjusted under 35 U.S.C. 154(b) by 376 days.

(21) Appl. No.: 10/202,736

(22) Filed: Jul. 24, 2002

(65) Prior Publication Data

US 2004/0019725 A1    Jan. 29, 2004

(51) Int. Cl.
    *G06F 13/00*    (2006.01)
(52) U.S. Cl. .................. 710/110; 710/38; 710/107
(58) Field of Classification Search .................. 710/21, 710/38, 42, 100, 107, 305, 313, 314, 316, 710/317; 340/3.1; 370/422, 423, 476
See application file for complete search history.

(56) References Cited

U.S. PATENT DOCUMENTS

| | | | |
|---|---|---|---|
| 4,304,001 A | 12/1981 | Cope | |
| 4,602,327 A * | 7/1986 | LaViolette et al. | ......... 710/107 |
| 4,688,168 A | 8/1987 | Gudaitis et al. | |
| 4,942,571 A | 7/1990 | Möller et al. | |
| 4,969,147 A | 11/1990 | Markkula, Jr. et al. | |
| 4,996,684 A | 2/1991 | Morley et al. | |
| 5,138,709 A | 8/1992 | Jones et al. | |
| 5,223,806 A | 6/1993 | Curtis et al. | |
| 5,274,783 A | 12/1993 | House et al. | |
| 5,323,385 A * | 6/1994 | Jurewicz et al. | ............ 370/300 |
| 5,367,678 A | 11/1994 | Lee et al. | |
| 5,437,060 A | 7/1995 | Delamater et al. | |

(Continued)

FOREIGN PATENT DOCUMENTS

EP    0 562 333 A2    9/1993

(Continued)

OTHER PUBLICATIONS

H. Kopetz; *TTP/A Protocol—Specification of the TTP/A Protocol*; TTTech Computertechnik AG, Time-Triggered Technology; May 16, 2001; pp. 1-35; XP-002254182.

(Continued)

*Primary Examiner*—Khanh Dang
(74) *Attorney, Agent, or Firm*—Alston & Bird LLP

(57) ABSTRACT

A system for establishing peer-to-peer communications via a network bus comprises a bus controller and at least one peer-to-peer grouping including a source device and at least one receiving device, all of which are in electrical communication with the network bus. The bus controller controls communications on the network bus and can transmit onto the network bus an express command, which is associated with the source device of one of the groupings and identifies data on the respective source device. The source device of a respective grouping is capable of receiving a transmitted express command, and the receiving devices of the respective grouping are capable of detecting the transmitted express command. Upon receipt, the source device is capable reading the data identified by the respective express command onto the network bus, and thereafter the receiving devices of the respective grouping are capable of automatically writing data from the network bus.

8 Claims, 5 Drawing Sheets

U.S. PATENT DOCUMENTS

| | | | |
|---|---|---|---|
| 5,445,128 | A | 8/1995 | Letang et al. |
| 5,557,634 | A | 9/1996 | Balasubramanian et al. |
| 5,615,404 | A | 3/1997 | Knoll et al. |
| 5,623,610 | A | 4/1997 | Knoll et al. |
| 5,694,555 | A | 12/1997 | Morriss et al. |
| 5,737,356 | A | 4/1998 | Harrison et al. |
| 5,742,847 | A | 4/1998 | Knoll et al. |
| 5,801,602 | A | 9/1998 | Fawal et al. |
| 5,809,027 | A | 9/1998 | Kim et al. |
| 5,909,556 | A * | 6/1999 | Morriss et al. ............. 710/100 |
| 5,978,875 | A | 11/1999 | Asano et al. |
| 6,009,491 | A * | 12/1999 | Roppel et al. ............. 710/305 |
| 6,134,485 | A | 10/2000 | Tanielian et al. |
| 6,195,724 | B1 | 2/2001 | Stracovsky et al. |
| 6,273,771 | B1 | 8/2001 | Buckley et al. |
| 6,452,928 | B1 | 9/2002 | Christie |

FOREIGN PATENT DOCUMENTS

| | | |
|---|---|---|
| WO | WO 99/63409 A1 | 12/1999 |
| WO | WO 00/62501 | 10/2000 |
| WO | WO 02 46938 A | 6/2002 |

OTHER PUBLICATIONS

H. Kopetz, G. Grunsteidl; *TTP—A Time-Triggered Protocol for Fault-Tolerant Real-Time Systems;* Fault-Tolerant Computing; FTCS-23; Digest of Papers, the Twenty-Third International Symposium on Toulouse, France Jun. 22-24, 1993, Los Alamitos, California; 1993; pp. 524-533; XP010251368; ISBN: 0-8186-3680-7.

T.W. Martin; *1394: High-Performance Serial Bus for Desktop and Portable Computers;* Computer Technology Review; 1994; pp. 46-49; Supplement No. 6, vol. 14; XP000451486; ISSN: 0278-9647; Westworld Production Co., Los Angeles, California.

INFINEON: *C167CR 16-BIT Single-Chip Microcontroller;* Apr. 2000; 72 pages; XP-002201995; Published by Infineon Technologies AG.

Tobias Wenzel; INFINEON: *CAN Baudrate Detection with Infineon CAN Devices;* Jul. 1999, 11 pages; XP-002201996.

PCT Notification of Transmittal of the International Search Report, PCT International Search Report for PCT/US02/13190 (filed Apr. 26, 2002).

PCT Notification of Transmittal of the International Search Report, PCT International Search Report for PCT/US02/13246 (filed Apr. 26, 2002).

PCT Notification of Transmittal of the International Search Report, PCT International Search Report for PCT/US02/13303 (Field Apr. 26, 2002).

PCT Notification of Transmittal of the International Search Report; PCT International Search Report for PCT/US02/13366.

PCT Notification of Transmittal of the International Search Report, PCT International Search Report for PCT/US02/13367 (Filed Apr. 26, 2002).

PCT Communication Relating to the Results of the Partial International Search for PCT/US/01/47393.

Robert Patzke; *Fieldbus basics;* 1998; pp. 275-293; Computer Standards & Interfaces 19 (1998); Elsiver Sciences B.V.

INTERSIL; *HE-15531 CMOS Manchester Encoder-Decoder;* Internet article, Mar. 1997; XP002298816; available at <http://www.intersil.com/data/fn/fn2961> (visited Sep. 29, 1998).

G.I. Gotlib, V. Ya. Zagurskii; *Decoding Techniques in Coaxial-Cable-Based Local-Area Networks;* 1989; pp. 47-54; vol. 23, No. 2; Automatic Control and Computer Sciences; Allerton Press, Inc.

Tobias Wenzel; *CAN Baudrate Detection with Infineon CAN devices;* Jul. 1997; 11 pages; Infineon Technologies; Microcontroller Division; XP002201996.

*IEEE Standard for a Smart Transducer Interface for Sensors and Actuators—Transducer to Microprocessor Communication Protocols and Transducer Electronic Data Sheet (TEDS) Formats*; Sep. 1998; 122 pages; IEEE Instrumentation and Measurement Society; IEEE Std 1451.2-1997; ISBN 1-55937-963-4.

* cited by examiner

SYSTEMS AND METHODS FOR ESTABLISHING PEER-TO-PEER COMMUNICATIONS BETWEEN NETWORK DEVICES COMMUNICATING VIA A COMMON BUS

FIELD OF THE INVENTION

The present invention relates generally to controlling communication on a network bus and, more particularly, to establishing peer-to-peer communication between network devices communicating via a common bus.

BACKGROUND OF THE INVENTION

As systems, such as the multimedia entertainment, communications, process control, and diagnostic systems utilized by the automotive and aerospace industries, become more complex, a need arises for additional devices to communicate, either with each other or with a central controller or the like. Historically, these systems included dedicated wiring extending between the various devices in order to support communications therebetween. As systems have become more integrated and the communications requirements have been increased, the amount of dedicated wiring that would be required has become excessively large, both in terms of the space required for the wiring and the cost of the wiring and the attendant installation. Moreover, as the amount of dedicated wiring increases, the overall complexity of the system also generally increases, as well as the likelihood that some portion of the wiring might be damaged or broken during or following installation.

As such, network systems have been developed to provide a common communications path between a plurality of network devices. In automotive and aerospace applications, for example, a network system can be utilized to monitor various components and to collect diagnostic and status information. In this regard, diagnostic and status information relating to the strain, acceleration, pressure and/or temperature to which the various components are subjected may be collected and analyzed.

By way of further example, a network bus architecture is currently being developed to support communications and the delivery of multimedia information to the occupants of a vehicle such as an automobile, minivan, sports utility vehicle, aircraft, boat or the like, or for use in process control applications that could be applied to a system such as a vehicle. Advantageously, this network bus would transport the audio signals, including streaming audio signals, produced by one or more of a radio, a cassette tape player, a compact disc player or the like to selected speakers or headphone jacks throughout the vehicle. Similarly, the network bus may support voice and data communications with a cellular telephone carried by an occupant of the vehicle, as well as communications with a laptop computer, a handheld computing device or the like. In addition, the network bus may transmit video signals, including streaming video signals, from a television receiver, a videocassette recorder or other video source to one or more video monitors. The system may also support process control applications such as automotive engine and transmission control, drive-by-wire, brake-by-wire, passive restraint, and/or collision avoidance systems that require highly reliable fault tolerant systems. Each of these systems could include a multitude of sensors and actuators that can be controlled using the network architecture under development. Further, the network bus system may transport information related to diagnostic performance of the vehicle.

In addition to the variety of devices that are connected to a network bus, one or more controllers are also generally connected to the network bus for sending commands to the various remote devices and receiving data from the remote devices. Among other things, these commands specify the manner in which the various devices are to function including the manner in which the various devices are to transmit information over the network bus.

Traditionally, networks of the type described above have transmitted data in analog format. Unfortunately, analog signals are susceptible to noise introduced into the signals during data transmission. Given that many of the transmitted signals have a low amplitude to start with, this noise can corrupt the signal and decrease the signal to noise ratio to levels that cause loss of resolution in the signal. Further, as many of these network devices are scattered some distance from the controller, the electrical lines connecting the network devices to the controller may be sufficiently long to cause signal degradation due to DC resistance in the wiring.

In light of these shortcomings, it would be advantageous to utilize digital networks. But, many conventional digital networks suffer from a variety of problems themselves. For example, many existing digital networks operate according to complicated protocols which require each network device to have a relatively high level processor, thereby increasing the cost of the network devices. Complicated protocols also introduce overhead into the messages on the bus that is not necessary for data acquisition and control. This overhead can severely limit the number of data samples that can be transmitted on the bus. These networks also have other problems. For example, they generally do not support both acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner. As such, these computer systems generally lack the capability to schedule a trigger on event command to the network components that repeats or is interpreted and executed with any precision.

Further, some conventional network systems operate in a master/slave configuration, where the bus controller controls all communication on the network bus. In these network systems, the bus controller uses an operation schedule that includes commands related to either one or a group of network devices and the timing for communicating with the network devices. As such, the bus controller mandates all or substantially all timing for communications.

Although placing the bus controller in control of all communications on the network bus is advantageous as it eliminates communication conflicts on the network bus, there may be some drawbacks to this configuration. Specifically, in some instances, it is desirable to move data directly from one or more network devices to other network devices without interdiction from any network controller, such as in the case of moving streaming audio signals.

To allow for peer-to-peer communication among network devices, some conventional network systems include dedicated wiring between various network devices for providing direct access between the network devices. As stated above, however, an important advantage of network systems is the replacement of dedicated wiring with a common network bus. The requirement of the additional dedicated wiring by the above-described network system is not consistent with this goal and suffers from problems, such as added cost of the wiring and the attendant installation, as well as the likelihood that some portion of the wiring might be damaged or broken during or following installation.

As an alternative to the use of dedicated wiring, other network systems require communications between network devices to proceed through the network controller. This alternative, however, is also undesirable. Because a constant flow of information is often transmitted by one network device and received by other network devices, the timing of the transfer of information is critical to the success of the transfer. Because transferring information through the network controller adds an extra element through which the information must travel, it unnecessarily adds time to the overall information transfer.

SUMMARY OF THE INVENTION

In light of the foregoing background, the various embodiments of the present invention provides systems and methods for establishing peer-to-peer communications in a network in a manner more efficient than conventional network systems. Embodiments of the systems and methods of the present invention allow source devices and receiving devices to establish peer-to-peer communications via a common network bus without dedicated wiring, as some conventional network systems require. Additionally, embodiments of the systems and methods of the present invention allow network devices to establish peer-to-peer communications without interdiction from a bus controller.

According to one aspect of the present invention, a system for establishing peer-to-peer communications via a network bus includes a bus controller and at least one peer-to-peer grouping, where each grouping includes a source device and at least one receiving device. The bus controller and the groupings are each in electrical communication with the network bus, and the bus controller controls communications on the network bus. The bus controller is capable of transmitting a read command that identifies data on the source device of one grouping Upon transmission of the read command, the source device of a respective grouping is capable of receiving the read command. The receiving devices, on the other hand, are capable of detecting the read command. In this regard, the receiving devices can be pre-configured to monitor the network bus for a read command transmitted from the bus controller to the source device of the respective grouping.

In response to the read command, the source device of the respective grouping is capable of reading the data identified by the read command onto the network bus, and thereafter the receiving devices of the respective grouping are capable of automatically reading data from the network bus, such as the data read from the source device. The bus controller can also be capable of transmitting a trigger command to the source device and receiving devices of the groupings before transmitting the read command. In this regard, the source device of the groupings is capable of receiving the trigger command and thereafter inputting data. And the receiving devices are capable of receiving the trigger command and thereafter outputting data.

According to another aspect of the present invention, the bus controller is capable of transmitting a trigger command that includes a group identifier identifying a respective grouping. In this regard, the source device is capable of receiving a trigger command including a respective group identifier and thereafter inputting data and reading data onto the network bus in response to receiving the trigger command. The receiving devices are also capable of receiving a trigger command including a respective group identifier. In contrast to the source device, however, the receiving devices are capable of outputting data and writing data onto the network bus in response to receiving the trigger command. The source device and receiving devices of each grouping can be pre-configured to receive a trigger command that includes a group identifier that identifies the respective grouping. The source device of each grouping can be pre-configured to read a predetermined amount of data onto the network bus in response to receiving the trigger command. Also, the receiving devices of each grouping can be configured to write a predefined amount of data from the network bus in response to receiving the trigger command.

A method of establishing peer-to-peer communications is also provided. The systems and methods of various embodiments of the present invention therefore allow source devices and receiving devices to establish peer-to-peer communications via a common network bus without dedicated wiring. Additionally, the systems and methods of various embodiments of the present invention allow network devices to establish peer-to-peer communications without interdiction from a bus controller. As such, the systems and methods of embodiments of the present invention provide for more efficient peer-to-peer communications in a less costly manner than conventional network systems, while also reducing the risk of damage or breakdown of dedicated wiring.

BRIEF DESCRIPTION OF THE DRAWINGS

Figure 1:
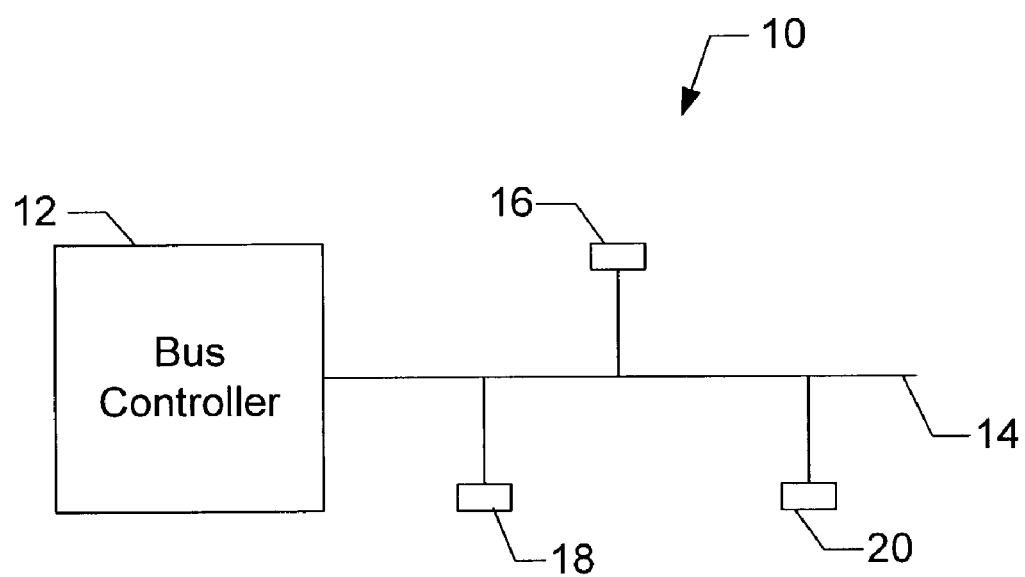
Figure 2:
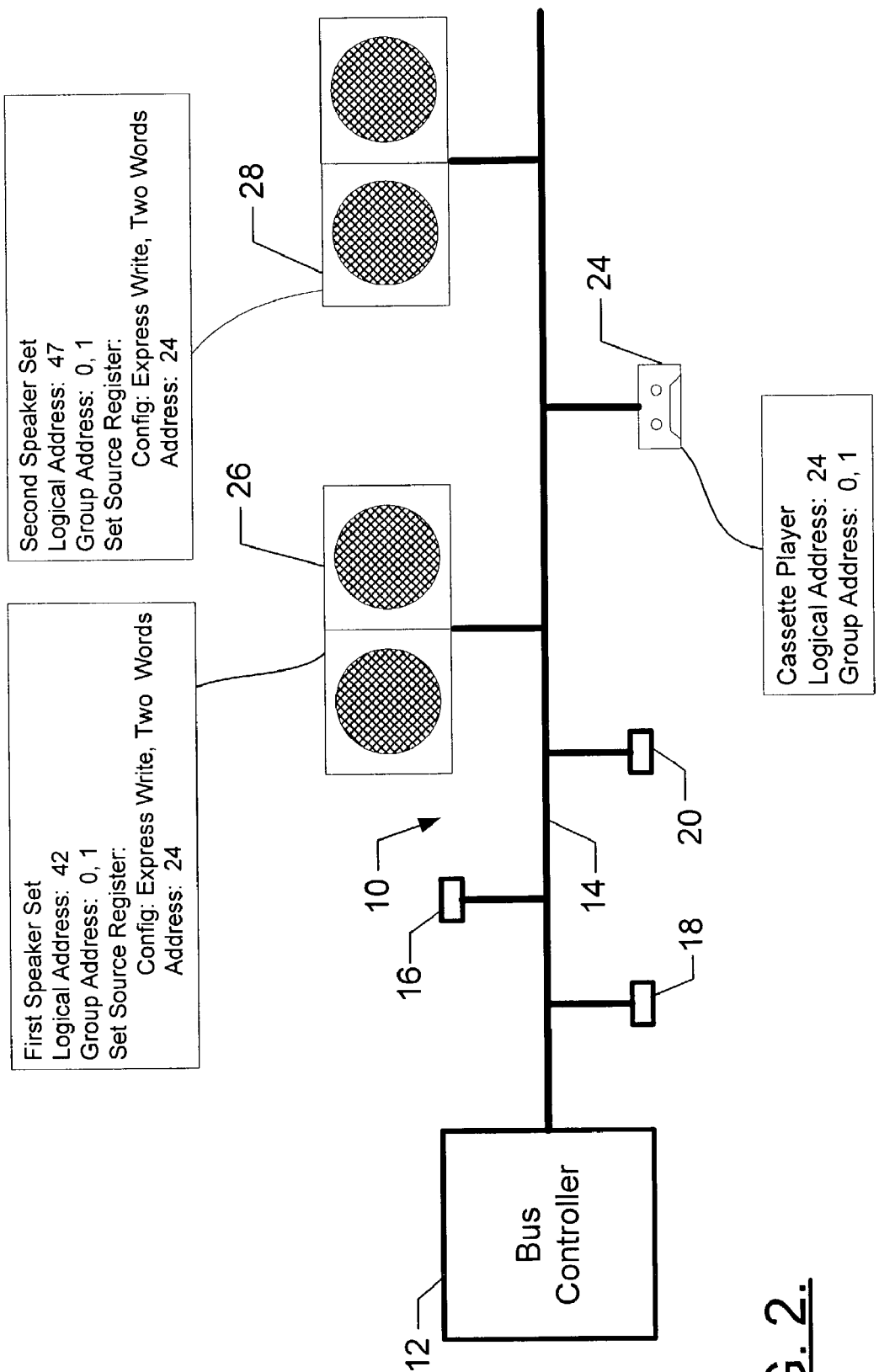
Figure 3:
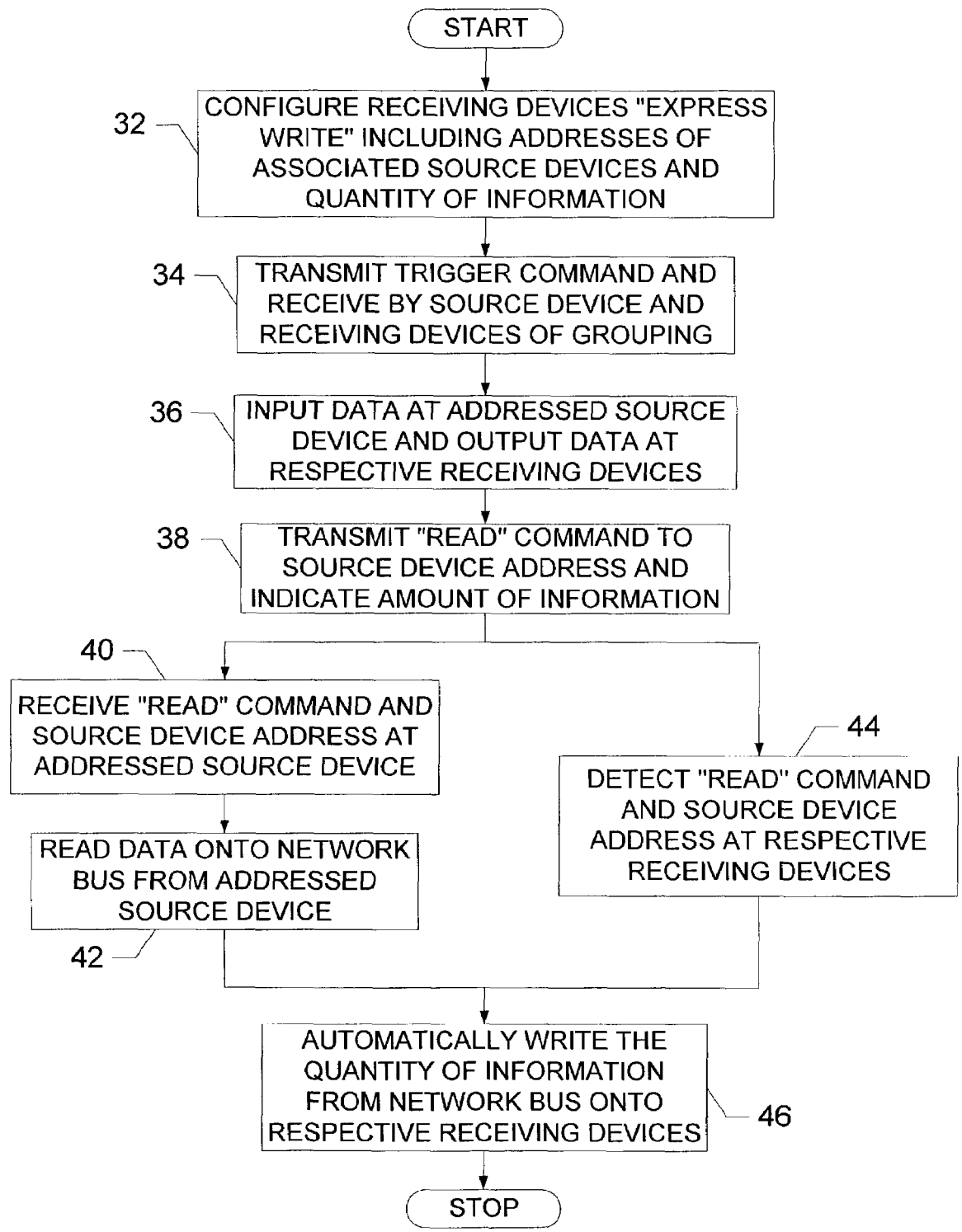
Figure 4:
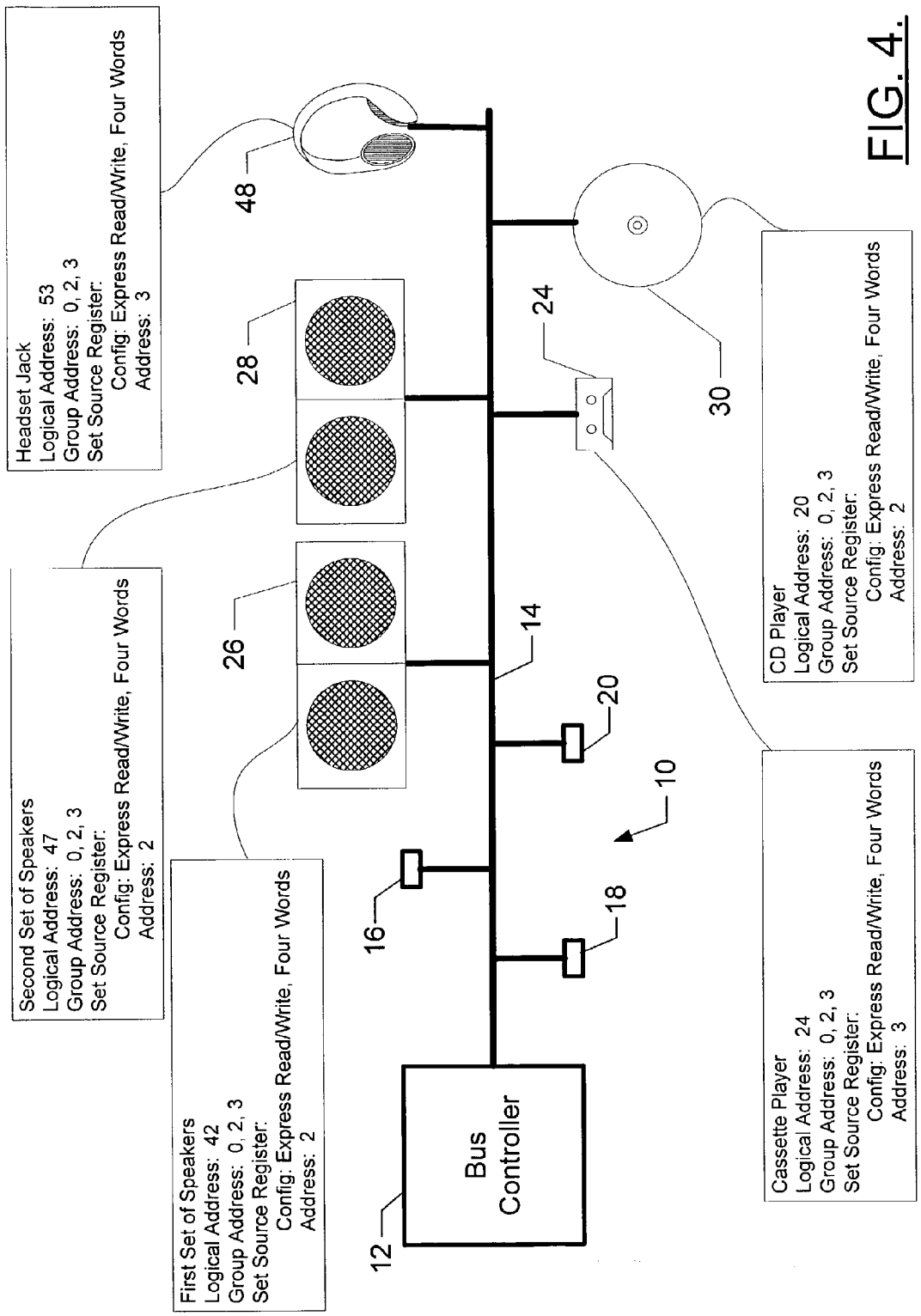
Figure 5:
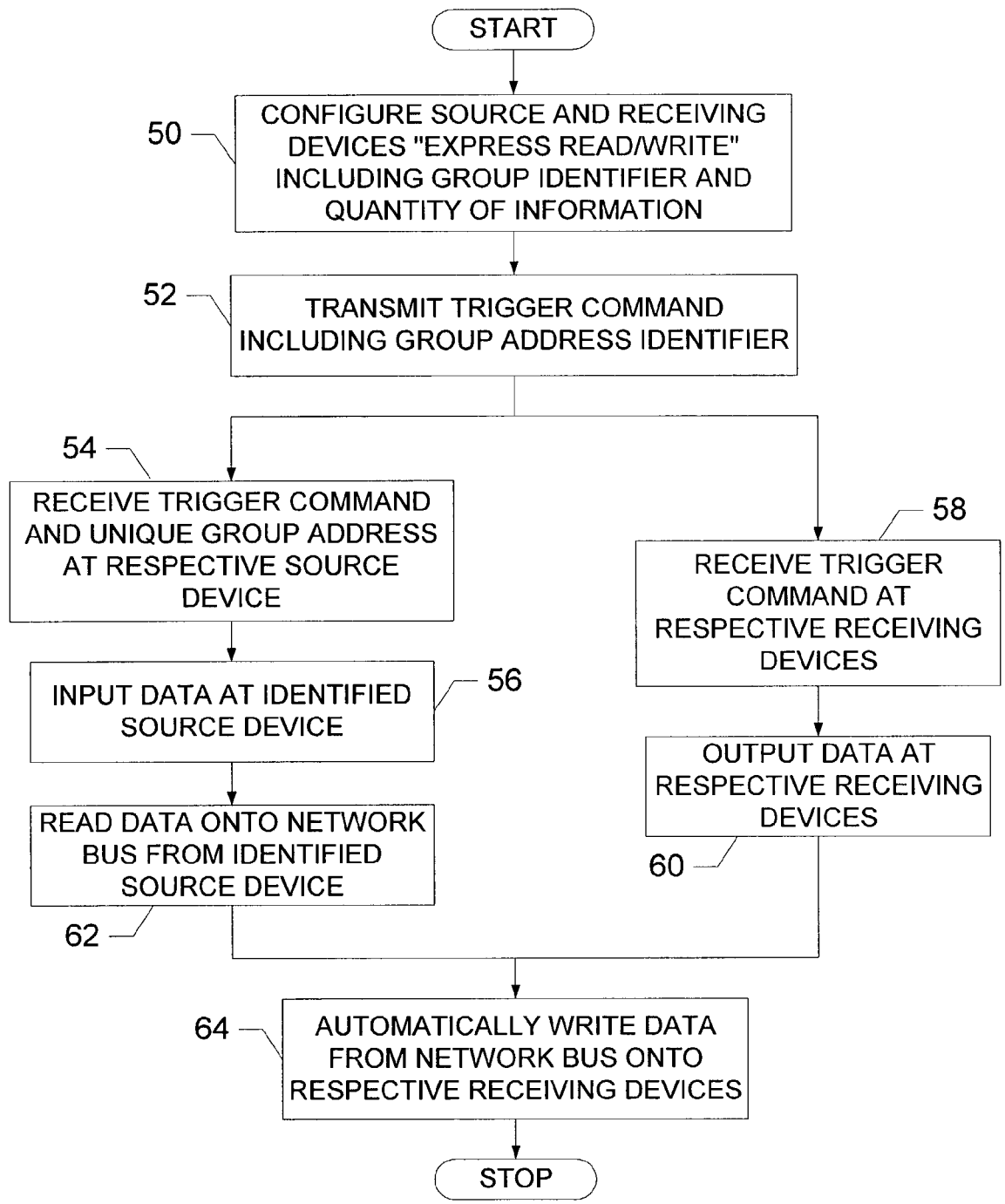

Having thus described the invention in general terms, reference will now be made to the accompanying drawings, which are not necessarily drawn to scale, and wherein:

FIG. 1 is a block diagram of a general network system in which the system and method of the present invention may be implemented;

FIG. 2 is a block diagram of a network system in which systems and methods of the present invention may be implemented according to one embodiment of the present invention, wherein the network system is in a vehicle in which source devices and receiving devices most efficiently communicate peer-to-peer;

FIG. 3 is flow chart illustrating a method of establishing peer-to-peer communications in a network system according to one embodiment of the present invention;

FIG. 4 is a block diagram of a network system in which systems and methods of the present invention may be implemented according to another embodiment of the present invention, wherein the network system is in a vehicle in which source devices and receiving devices most efficiently communicate peer-to-peer; and FIG. 5 is flow chart illustrating a method of establishing peer-to-peer communications in a network system according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed briefly above and in greater detail below, the present invention provides systems and methods for establishing peer-to-peer communications in a network system. Importantly, the systems and methods of the present invention configure at least one group of network devices that are connected to the network bus to at least partially communicate without interdiction from the bus controller to thereby permit more efficient communication, such as in the case of streaming audio or video signals.

At the outset, it is important to note that the systems, methods, and bus controllers of the present invention may be implemented in any type of network system. The network system may be resident in an aircraft, spacecraft, vehicle, building, factory, or any other packages, structures, or environment. As examples, the systems, methods, and bus controllers of the present invention may be implemented in a network system resident on a rotary-wing aircraft, in which the network includes a plurality of sensors, actuators, etc. all connected to a common network bus for communication with a bus controller to determine performance, status, etc. concerning the various components of the aircraft. For example the network devices can include sensors for monitoring strain, acceleration, and pressure of the aircraft's main rotor system.

The systems, methods, and bus controllers of the present invention may also be implemented in a network system in a vehicle such as an automobile in which the network system includes sensors and actuators connected to different components of the vehicle. For example, the network devices can include sensors for monitoring the throttle position, the oil pressure, the water temperature, the transmission fluid pressure, the seat position, the antilock brake system, the suspension, the passive restraint system and the steering system, to name but a few. Alternatively, the network devices may include an actuator for performing a particular function in response to a command from the bus controller. In the automotive application, for example, the network devices can include actuators for controlling the throttle position, the anti-lock brake system, the suspension, the passive restraint system and the active suspension system, to name but a few.

Still further, the network devices may include an audio or video source. In this regard, the network devices can include radio receivers, tape cassette players, compact disc players, cellular telephone receivers or other audio sources for providing audio signals, including, in some instances, streaming audio signals, to the network bus. Correspondingly, the network devices can include speakers, headphone jacks or the like for receiving audio signals from the network bus and for providing a corresponding audible output. Similarly, network devices can include a television receiver, a video cassette player or other video source for providing video signals, including streaming video signals, to the network bus. Accordingly, network devices can include a video monitor or the like for receiving the video signals and for displaying images based upon the video signals.

It is also understood that the present invention may be used in any particular protocol and network structure without departing from the invention. In one advantageous embodiment, however, the systems, methods, and bus controllers of the present invention are implemented in the protocol and network structure described in U.S. patent application Ser. No. 09/735,146, entitled: Network Device Interface for Digitally Interfacing Data Channels to A Controller via A Network, filed on Dec. 12, 2000 and U.S. patent application Ser. No. 09/736,878, entitled: Network Controller for Digitally Controlling Remote Devices via A Common Bus, filed on Dec. 14, 2000, the contents of both of which are incorporated herein by reference. This protocol and network structure offers many advantages over many conventional digital networks.

Specifically, as discussed previously, many existing digital networks operate according to complicated protocols which require each network device to have a relatively high level processor. This, in turn, may increase the cost of the network devices. Further, the high level protocol may introduce overhead into the messages on the bus that can severely limit the number of data samples that can be transmitted on the bus. These networks also generally do not support both acquisition and control, and they typically only support networks that extend over relatively short lengths. Further, these networks typically have bulky network device interfaces, slow network data rates and/or a low network device count. Additionally, many computer systems that include digital networks do not operate in a time-deterministic manner, and as such, lack the capability to schedule a trigger command to the network components that repeats or is interpreted and executed with any precision timing.

In light of these shortcomings with conventional digital network systems, the digital network structure and protocol of U.S. patent application Ser. No. 09/735,146 and Ser. No. 09/736,878 use a low-level instruction set allowing less complicated devices to be implemented. The newly developed network system and protocol also allows for increased data rates and uses a command structure that allows for precision timing data acquisition or other actions on the network bus.

In one advantageous embodiment of the present invention, the functions of the present invention are added to the existing command structure of this network structure and protocol. In this embodiment, the system, methods, and functions of the present invention are implemented in the digital network structure and protocol of U.S. patent application Ser. No. 09/735,146 and Ser. No. 09/736,878. Specifically, the commands described below may be implemented with the same structure as those of the protocol, and the communication structure is the same.

With reference to FIG. 1, a generalized network system in which the present invention may be implemented is illustrated. Specifically, FIG. 1 illustrates a common network system 10 having a host computer or bus controller 12, a network bus 14, and a number of network devices 16–20. In this configuration, the bus controller typically provides configuration and control of the network 10. Further, the individual network devices include assigned identifiers or addresses that uniquely define the network devices on the bus. In operation, the bus controller typically sends commands via the network bus to the network devices, along with the address of the network device or network devices that are supposed to follow the command. The network device or devices designated by the address sent with the command perform the actions associated with the command and may respond by placing data on the network bus to be sent to either the bus controller or another network device. Additionally, or alternatively, the network device or devices designated may respond to a command, such as a trigger command, by initiating an incoming data measurement in a network device, such as a sensor, or move a value to an output in a network device, such as an actuator.

In some embodiments, one or more network devices may include a network device interface (NDI), not illustrated, connected to the network 10. The NDI is used in embodiments in which transducers, whether sensors or actuators, cannot communicate directly with the bus controller 12. The NDI receives and interprets commands from the bus controller and controls signal conditioning, such as receiving data from sensors or activating actuators, based on the commands and data from the bus controller. The NDI may include a block of stack memory for storing the data and/or messages from the sensors and/or actuators. In this embodiment, the bus controller is capable of pushing data on or popping data off of the top the stack memory. Also, the NDI can receive, format and send data from the signal conditioning devices to the bus controller. As the present invention is focused on peer-to-peer communications between network devices 16–20, the various embodiments below do not mention the communication between the bus controller and NDI, but instead depict the network device as communicating with the bus controller. It must be understood that in some embodiments, the network devices will include needed components to properly communicate with the bus controller, while in other embodiments, the network device will be associated with an NDI. As such, the various communications of the network devices discussed below may be performed by either the network device or an NDI associated with the network device. A complete detailed disclosure of such an NDI is provided in U.S. patent application Ser. No. 09/736,878.

Each network device 16–20 and/or NDI (including the bus controller 12) generally contains a set of memory, referred to as a Transducer Electronic Data Sheet (TEDS), that stores configuration and calibration data. Some of the memory areas included within the TEDS are not changeable by the user. Other areas are mandatory user areas for data such as logical and group addresses, discussed below, and an ASCII description area, and yet other areas are not mandatory.

Because the bus controller 12 connects to the network devices 16–20 via a common network bus 14, the bus controller does not require dedicated connections to each network device to control the network 10. The bus controller instead uses an addressing scheme to assign and control each of the network devices. To operate the network, each network device is assigned one or more addresses, including a logical address, global address and, if configured, one or more group addresses. A logical address is an address recognized by a single network device that the bus controller uses to direct a command, or request, to a particular network device. A global address, on the other hand, is an address recognized by all of the network devices on the network which the bus controller uses to exchange universal data and commands. For example, the global address scheme permits the bus controller to universally initialize or reset all of the network devises. A group address is an address that can be recognized by a particular group of network devices on the network which the bus controller can use to exchange group data and commands. For example, the group address scheme permits the bus controller to set up time deterministic triggers for groups of network devices at various sample rates. Additionally, as described below, the group address scheme can permit groups of network devices to establish peer-to-peer communications on the network bus without interdiction from the bus controller.

As stated, the global address is used for the exchange of global data and commands. The group address is an address that can be recognized by multiple network devices 16–20 and can be used for the exchange of data and commands to a group or subset of network devices on the network 10. Associated with the group address is a group mask stored in the network device. The group mask of one embodiment is a 16-bit word, representing 16 predetermined network addresses, where each bit set to "1" represents an address of the group that the remote device belongs.

As an example, in one embodiment, the global address is assigned as 0000hex. In this embodiment, if the bus controller 12 transmits the address 0000hex, all of the network devices 16–20 will follow the command. Further, in one embodiment, the group addresses are selected in the range of 0001hex to 000fhex, representing the range available in the network device's group mask. In this embodiment, when the bus controller transmits an address in this range to a network device, the network device will compare the group address with the group mask it has stored. If the bit in the group mask corresponding to the group address is set, the network device will interpret and follow the command associated with the group address. For example, if the network device has the group mask 100000001100bin stored, the network device belongs to group addresses 000fhex, 0003hex, and 0002hex. The bus controller typically uses global and group addresses for service commands, triggering, resetting the system or testing the network 10, as well as establishing peer-to-peer communications.

As discussed, some network systems are used in conjunction with processes desiring communication between network devices without interdiction from a bus controller. For example, some network systems may include network devices comprising source devices, such as audio or video sources, that would operate in a most efficient manner by communicating directly with other network devices comprising receiving devices. In this regard, as described above, the network devices 16–20 can include source devices such as radio receivers, tape cassette players, compact disc players, cellular telephone receivers or other audio sources for providing audio signals, including, in some instances, streaming audio signals, to the network bus 14. Additionally, or alternatively, the network devices can include source devices such as a television receiver, a video cassette player or other video source for providing video signals, including streaming video signals, to the network bus. To receive signals, such as streaming audio signals, from the network bus and provide a corresponding output, the network system can include receiving network devices such as speakers, headphone jacks or the like. Similarly, to receive signals, such as streaming video signals, and display images based upon the video signals, the network devices can include a video monitor or the like.

For example purposes, FIGS. 2 and 4 illustrate the network system of FIG. 1 integrated into an automobile. The network system 10 of this embodiment, includes a bus controller 12 connected to a network bus 14 for controlling communications on the network bus. The network system further includes a plurality of network devices 16–20, such as sensors, actuators, multimedia devices, etc, for performing different functions on the automobile.

Importantly, the network system 10 further includes at least one grouping of network devices 24–28 used to send and receive data via the network bus without interdiction from the bus controller. In this regard, each grouping comprises one source device and at least one receiving device. In the illustrated example, the network devices include a tape cassette player 24, and two pairs of speakers 26 and 28. The tape cassette player 24 is the only source selected to provide network traffic. Both pairs of speakers 26 and 28 are configured using the Express Write configuration to receive data from the cassette player. As indicated above, the network devices include a logical address and group addresses. In this regard, the illustrated example, the network devices each have an assigned logical and at least one group address, as shown in Table 1.

TABLE 1

| Network Devices | Logical Address | Group Address(s) |
|---|---|---|
| Tape Cassette Player | 24 | 0, 1 |
| First Stereo Left/Right Speakers | 42 | 0, 1 |
| Second Stereo Left/Right Speakers | 47 | 0, 1 |

In a conventional operation, the source device 24 could communicate with the receiving devices 26, 28 through individual commands from the bus controller 12. In this regard, the bus controller would transmit a trigger command via the network bus 14 to the grouping according to a group address common to all of the network devices in the grouping. Upon receipt of the trigger command from the network bus, the source device of the respective grouping would input data and hold the data in a register within the cassette player. At the same time, the receiving devices of the respective grouping would output data held in registers within the receiving devices. For example, if the bus controller transmitted a trigger command to group address "1" the cassette player 24 would input data, such as an audio data sample from a loaded cassette tape, and the first and second sets of stereo speakers 26 and 28 would output data currently stored within the speakers, such as an audio data sample in the form of an audible output.

Following the trigger command in the conventional operation, the bus controller 12 would transmit a read command indicating an amount of data to the source device using the logical address of the source device. As used herein, the term "read" will be used to designate data read from the perspective of the network bus 14. For example, the bus controller could transmit a read command to the cassette player 24 by transmitting a read in-data, double word, address 24. Upon receipt of the read command, the cassette player would read in two words (e.g., 32-bits) of data (e.g., stereo left and right channel data previously input to the cassette player from the cassette tape) onto the network bus 14, which the bus controller would then receive off of the network bus.

Following receipt of the data, the bus controller 12 would transmit a write command to the receiving devices of the respective grouping followed by the data to be written. Similar to the read command, as used herein the term "write" will be used to designate data written from the perspective of the network bus. In this regard, the write command could indicate the amount of data to write from the network bus 14, and indicate the desired receiving devices according to either the logical address in the case of one receiving device, or group address in the case of multiple receiving devices. For example, the bus controller could transmit a write out-data, double word, address 42 to command the first set of left and right speakers 26 to write two words of data from the network bus. The bus controller could alternatively transmit the same command to group address 1 to command both the first and second sets of speakers 26 and 28 to write two words of data from the network bus.

By requiring the communication between the source device and receiving devices of a respective grouping to proceed through the bus controller 12, the communication requires a large number of steps and, thus, a large amount of processing time. In this regard, the systems and methods of the present invention provide for communication directly between source devices and receiving devices without proceeding through the bus controller. Referring to FIG. 3, to allow for direct communication, in one embodiment, one or more receiving devices can be configured for an Express Write process. As described below, within a receiving device, the Express Write process causes the receiving device to execute a write command when a read command, addressed to a particular source device, is issued on the network bus. In this regard, the amount of data the read command instructs the source device to read onto the network bus generally equals the amount the receiving device is configured to write from the network bus. The configuration can be accomplished in any number of manners but, in a preferred embodiment, a flag enabling the Express Write process, along with addresses of the respective source devices and quantity of data, are stored in a set source register included within the TEDS of the receiving devices. (Block 32). As shown in FIG. 2, for example, the set source register of first set of speakers 26 can be set with Express Write, two words, address 24. In this manner, the first set of speakers is configured for peer-to-peer communications, two words at a time, with the source device set at logical addresses 24, namely, the tape cassette player 24.

Once the receiving devices are configured, the configured receiving devices will monitor the network bus 14 for read commands addressed to the source address listed in their set source register. To initiate the peer-to-peer communication, the bus controller 12 preferably proceeds, as before, by transmitting a trigger command to one of the groupings according to a group address common to all network devices of the grouping. (Block 34). Upon receipt of the trigger command from the network bus, the source device inputs data and the receiving devices output data. (Block 36). Following the trigger command, the bus controller transmits a read command indicating an amount of data to the source device according to the logical address of the source device. (Block 38). In this regard, the amount of data included in the read command equals the amount of data configured into the set source register of the receiving devices.

Upon receipt of the read command, the source device reads in the indicated amount of data onto the network bus 14. (Blocks 40 and 42). Unlike the conventional method of communicating between the source device and receiving devices, however, the receiving devices are monitoring the network bus for read commands transmitted to addresses configured in the receiving devices' set source register. Thus, when the respective receiving devices detect the read command addressed to a source device whose address is stored in the receiving devices' set source register, the receiving devices will automatically write the quantity of data indicated in the receiving devices' set source register from the network bus onto the respective receiving devices. (Blocks 44 and 46). For example, in the embodiment illustrated in FIG. 2, if the bus controller 12 transmitted a read command to the cassette player 24 at logical address 24 and indicated double word, the first set of speakers 26 and the second set of speakers 28 would detect the read command because logical address 24 is configured into each speaker's respective set source registers. Following detection of the read command, the first and second speaker sets would wait for the data to be read onto the network bus and thereafter automatically write the data from the network bus 14. Following the data being written into the receiving devices, the data can be stored in the receiving devices, such as in a data register, and thereafter output on a subsequent trigger command transmitted to the respective receiving devices from the bus controller.

Referring now to FIG. 4, in another embodiment of the present invention, not only are the receiving devices of each grouping configured for peer-to-peer communication, but also the source device of each group is similarly configured. As previously stated, the bus controller 12 can use the group addressing scheme to address a particular group of network devices on the network to exchange group data and commands. In this regard, the source device and receiving devices of each grouping can be configured for peer-to-peer communication by being assigned a group address in the form of a group indicator within the set source register. As shown in FIG. 4, the system further includes a second source device in the form of a CD player 30, and a third receiving device in the form of a headphone jack 48. Thus, in the example illustrated in FIG. 4, two different groupings can be assigned two different group indicators, i.e., 2 and 3. In this regard, the illustrated example, the network devices each have an assigned logical, at least one group address, as well as a group indicator, as shown in Table 2.

TABLE 2

| Network Devices | Logical Address | Group Address(s) | Group Initiator |
|---|---|---|---|
| Compact Disc Player | 20 | 0, 2, 3 | 2 |
| Tape Cassette Player | 24 | 0, 2, 3 | 3 |
| First Stereo Left/Right Speakers | 42 | 0, 2, 3 | 2 |
| Second Stereo Left/Right Speakers | 47 | 0, 2, 3 | 2 |
| Headphone Jack | 53 | 0, 2, 3 | 3 |

As illustrated, while a grouping can include more than one receiving device, each group includes only one source device because only one source device can read data to the network bus 14 at one time. But while one grouping can include only one source device, the same source device can be included in multiple groupings. In the illustrated embodiment of FIG. 4, because all of the network devices include addresses 2 and 3 in the respective lists of group addresses, a trigger command to one of the groupings according to a group address is common to all network devices. Referring to FIG. 5, to allow for direct communication between the source device and receiving devices of each grouping, the respective source device and receiving devices are configured for an Express Read/Write process. (Block 50).

Each grouping can be configured for the Express Read/Write process according to any of a number of different manners. But in a preferred embodiment, to configure each grouping for the Express Read/Write process, the respective source device and receiving devices are configured with a flag enabling the Express Read/Write process, along with a respective group indicator and a quantity of data, all of which can be stored in the set source register of the respective receiving devices and a set source register of the respective source device. As described below, once configured for the Express Read/Write process, the Express Read/Write process causes the respective source device to execute a read command when a trigger command containing the address within the set source register is issued on the network bus 14. Similarly, the Express Read/Write process causes the receiving devices to execute a write command when a trigger command containing the address within the set source register is issued on the network bus. Because the receiving devices write data from the network bus that the source device previously read onto the network bus, the amount of data the source device reads onto the network bus equals the amount of data configured to be written from the network bus by the receiving devices.

To initiate peer-to-peer communication between the source device and receiving devices of a respective grouping, the bus controller 12 transmits a trigger command along with one of the group identifiers onto the network bus 14. (Block 52). For example, if the bus controller desired to initiate direct communication between the tape cassette player 24 and the headphone jack 48, the bus controller would transmit a trigger command along with group identifier address 3. In the same manner, if the bus controller 12 desired to initiate direct communication between the CD player 30 and the first and second sets of speakers 26 and 28, the bus controller would transmit a trigger command along with group identifier address 2.

After transmission of the trigger command and group identifier, the source devices in the respective grouping receive the trigger command from the network bus 14 and thereafter, in response to the trigger command, input data, such as into an internal first-in-first-out (FIFO) memory. (Blocks 54 and 56). For example, after transmission of the trigger command along with group identifier 2, the cassette player 24 and CD player 30 input data, such as an audio data sample from a loaded cassette tape or compact disc, since the cassette player and the CD player are both members of grouping 2. Likewise, after transmission of the trigger command and group identifier, the receiving devices in the respective grouping receiving the trigger command and, in response to the trigger command, output data, such as from an internal FIFO memory of the respective receiving devices. (Blocks 58 and 60). For example, after transmission of the trigger command along with group identifier 2, the first set of speakers 26, the second set of speakers 28, and the headphone jack 48 all output a data, such as an audio data sample in the form of an audible output, since all of the receiving devices are members of grouping 2.

After the source devices input data in response to the trigger command, the source device having the respective grouping identifier configured in the set source register reads the quantity of data that is configured in the set source register onto the network bus 14. In this regard, the data can be read from FIFO memory of the source device. For example, as illustrated in FIG. 4, after the CD player 30 inputs a data sample in response to the trigger command along with group identifier 2, the CD player reads out four words of data onto the network bus, since the CD Player has grouping 2 configured in its set source register. (Block 62). Likewise, after the receiving devices output data in response to the trigger command, the receiving devices having the respective grouping identifier configured in the set source register writes the quantity of data that is configured in the set source register from the network bus. In this regard, the data can be written from FIFO memory of the respective receiving devices. For example, after the first and second sets of speakers 26 and 28 output a data sample in response to the trigger command along with group identifier 2, the first and second sets of speakers write four words of data words from the network bus and store the words, such as into an internal FIFO memory. (Block 64).

Continuing the example above, presume the next trigger command is issued for grouping 3. In this regard, in the same manner as the CD player 30 above, the trigger command will cause the cassette player 24 to essentially pass four words of data to the headphone jack 48. Advantageously, alternating the trigger commands between group address 2 and 3 results in the proper amount of data being passed between the respective source devices and receiving devices such that the time deterministic sampling rate of the respective source devices and receiving devices is preserved.

It should be understood that the data read onto the network bus by source devices can comprise the data output input by the respective source devices in response to the trigger command, particularly when the amount of data input equals the amount of data configured in the set source register of the respective source devices. Similarly, the data output input by receiving devices can comprise the data written from the network bus by the respective receiving devices, particularly when the amount of data input equals the amount of data configured in the set source register. In a preferred embodiment, however, where the source devices and receiving devices include a FIFO memory, the amount of data read onto the network bus by the receiving devices, and the amount of data output by the receiving devices, comprise data stored in the FIFO memory of the source devices and receiving devices, respectively. Thus, the amount of data input by the source devices is thereafter stored in the FIFO memory of the respective sources devices for subsequent reading onto the network bus. Similarly, the amount of written from the network bus by the receiving devices is thereafter stored in the FIFO memory of the receiving devices for subsequent output by the receiving devices. Therefore, the data input by the source devices and thereafter read onto the network bus, and the data written from the network bus and thereafter output by the receiving devices, can be cycled in and out of the source devices and receiving devices in a time-deterministic manner.

At this point it should also be understood that the group identifier is merely a special type of group address. In this regard, and because the source device and receiving devices of each group either input or output data prior to reading or writing data, respectively, each group identifier included within a respective network device's set source register must also be included within the respective network device's list of group addresses. Thus, for example, in order to support in order for the cassette player 24 and the CD player 26 for the Express Read/Write process, group identifiers 3 and 2 must be stored in the set source register and the list of group addresses of the cassette player and CD player, respectively. Similarly, in order to support the first and second sets of speakers 28 and 30, and the headphone jack 48, for the Express Read/Write process, group identifiers 2 and 3 must be stored in the set source register and the list of group addresses of the speakers and the headphone jack, respectively.

To allow for proper operation of the embodiment illustrated in FIG. 4, the receiving devices are preferably capable of buffering data, such as in a FIFO memory location. The addition of the data buffer accounts for three characteristics of the system. First, as stated, one or more receiving devices can be included within a grouping, but only one source device can be included within a grouping. Second, because only one source device can be included within a grouping, each group identifier must be unique to a particular source device. Third, as also stated, each network device of each grouping includes the respective group identifier in both the set source register and the list of group addresses of the respective network devices.

Therefore, various embodiments of the present invention provides systems and methods for establishing peer-to-peer communications in a network system. Embodiments of the present invention allow the network devices to establish peer-to-peer communications in a fewer number of operations than conventional systems and methods and, thus, requires less time to complete than the conventional systems and methods. In this regard, the source devices and receiving devices are capable of establishing peer-to-peer communications via a common network bus, without dedicated wiring, as some conventional network systems require. Additionally, the systems and methods of various embodiments of the present invention allow network devices to establish peer-to-peer communications without interdiction from a bus controller.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for establishing peer-to-peer communications via a network bus, said system comprising:
   a bus controller in electrical communication with the network bus for controlling communications on the network bus; and
   at least one peer-to-peer grouping, wherein each grouping comprises:
      a source device in electrical communication with the network bus; and
      at least one receiving device in electrical communication with the network bus,
   wherein said bus controller is capable of transmitting a read command that identifies data on the source device of one grouping, wherein the source device of the respective grouping is capable of receiving the read command, wherein the at least one receiving device of the respective grouping is also capable of detecting the read command, wherein the source device of the respective grouping is capable of reading the data identified by the read command onto the network bus in response to the read command, and thereafter the at least one receiving device of the respective grouping is capable of automatically writing data from the network bus in response to the read command.

2. A system according to claim 1, wherein said bus controller is further capable of transmitting a trigger command to the source device and at least one receiving device of the at least one grouping before transmitting the read command, wherein the source device of the at least one grouping is capable of receiving the trigger command and thereafter inputting data, and wherein the at least one receiving device of the at least one grouping is capable of receiving the trigger command and thereafter outputting data.

3. A system according to claim 1, wherein the at least one receiving device of each grouping is pre-configured to monitor the network bus for a read command transmitted from said bus controller to the source device of the respective grouping.

4. A system according to claim 1, wherein said bus controller is capable of transmitting a trigger command that includes a group identifier identifying the respective grouping, wherein the source device and at least one receiving device of the identified grouping is capable of receiving the trigger command, wherein the source device of the respective grouping is capable inputting data and reading data onto the network bus in response to receiving the trigger command, and wherein the at least one receiving device of the respective grouping is capable of outputting data and writing data from the network bus in response to receiving the trigger command.

5. A system according to claim 4, wherein the source device and the at least one receiving device of each grouping are pre-configured to receive a trigger command that includes a group identifier that identifies the respective grouping, wherein the source device of each grouping is further configured to read a predetermined amount of data onto the network bus in response to receiving the trigger command, and wherein the at least one receiving device of each grouping is configured to write a predefined amount of data from the network bus in response to receiving the trigger command.

6. A method of establishing peer-to-peer communications in a network comprising a plurality of network devices communicating via a common network bus, wherein the plurality of network devices includes at least one peer-to-peer grouping, and wherein each grouping comprises a source device and at least one receiving device, said method comprising:

transmitting a read command onto the network bus, wherein the read command identifies data on the source device of one grouping;

receiving the transmitted read command at the source device of the respective grouping, and detecting the transmitted read command at the at least one receiving device of the respective grouping; and in response to the read command.

reading the identified data from the source device of the respective grouping onto the network bus and thereafter automatically writing data from the network bus onto the at least one receiving device of the respective grouping.

7. A method according to claim 6 further comprising:

transmitting a trigger command to the source device and at least one receiving device of the at least one grouping; and inputting data to the source device of the at least one grouping and outputting data from the at least one receiving device of the at least one grouping, wherein transmitting the trigger and inputting data occurs before transmitting the read command.

8. A method according to claim 6 further comprising pre-configuring the at least one receiving device of each grouping to detect a read command transmitted to the source device of the respective grouping before transmitting the read command.

* * * * *